United States Patent [19]

Satterlee

[11] 4,268,812
[45] May 19, 1981

[54] MINIATURE DEVICE FOR SENSING OVERHEATING OF BEARINGS

[76] Inventor: Jesse D. Satterlee, 1012 S. Oak St., Hillsboro, Ill. 62049

[21] Appl. No.: 49,211

[22] Filed: Jun. 18, 1979

[51] Int. Cl.³ .......................................... H01H 37/04
[52] U.S. Cl. .................................. 337/380; 337/372
[58] Field of Search ............... 337/380, 381, 372, 113, 337/348, 3

[56] References Cited

U.S. PATENT DOCUMENTS 3,575,645  4/1971  Doversberger ........................ 337/3
3,861,032  1/1975  Schmitt et al. ....................... 337/348

*Primary Examiner*—Harold Broome
*Attorney, Agent, or Firm*—Ralph F. Staubly

[57] ABSTRACT

A miniature device for sensing overheating of bearings has a small flat-bottomed circular cup (e.g. fifteen millimeters in diameter) and has an integrally connected co-axial heat-conducting rod extending downwardly from its lower surface for good heat-exchange insertion into a bore made for it in a bearing element. The rod is preferably threaded to improve both its anchorability and its heat-exchange value. A bimetallic snap-disc thermostat lies in and on the bottom of the cup. A small inverted cup of electrically insulating hard plastic has a beaded lip embraced by the crimped rim of the metallic cup to form a housing for a normally closed switch whose spring-arm contact elements are fixed to the inverted plastic cup. An insulating disc closes the bottom of the inverted cup, forms a shallow retaining chamber for the snap-disc, and is centrally axially bored to serve as a guide for an insulating pin by which the thermostat disc operates the switch. The switch assemblage is packed in insulating plastic material in a close-fitting plastic housing.

5 Claims, 6 Drawing Figures

MINIATURE DEVICE FOR SENSING OVERHEATING OF BEARINGS

OBJECTS OF THE INVENTION

It is the principal object of this invention to provide a device for sensing the overheating of bearings which is very small for use in close quarters yet is sturdy and reliable. Other objects and advantages will become apparent as the following description proceeds.

Figure 4:
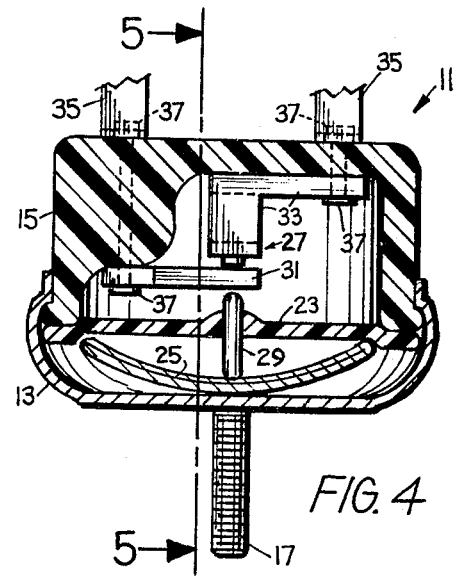
FIG. 4 is an enlarged elevational view in section taken on the line 4—4 of FIG. 2.

With reference now to the drawings, the numeral 11 generally designates the miniature sensor, which basically comprises a metallic cup 13 formed of a corrosion-resistant and good-heat-conducting metal (e.g. an aluminum or brass or another high-copper alloy), and an inverted cup 15 of heat-resistant electrically insulating hard-plastic material. The cups 13 and 15 are connected by crimping the rim of the cup 13 over a peripheral bead around the rim of the cup 15 (FIG. 4). The cups 13 and 15 have diameters of the order of 15, but less than 20, millimeters.

Figure 1:
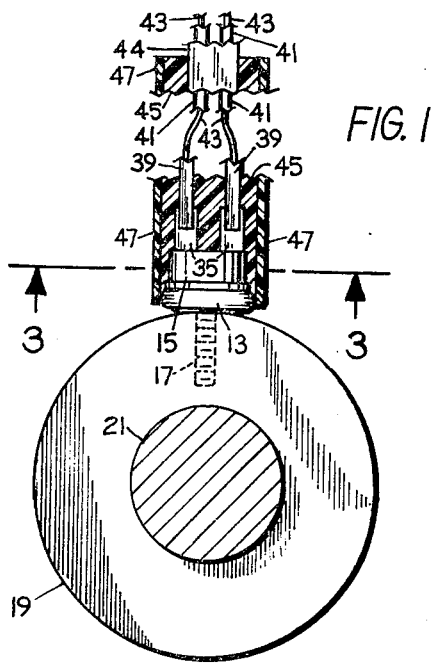
FIG. 1 is a front elevational view of a preferred embodiment of the invention, with the sheath and packing partly broken away.
Figure 2:
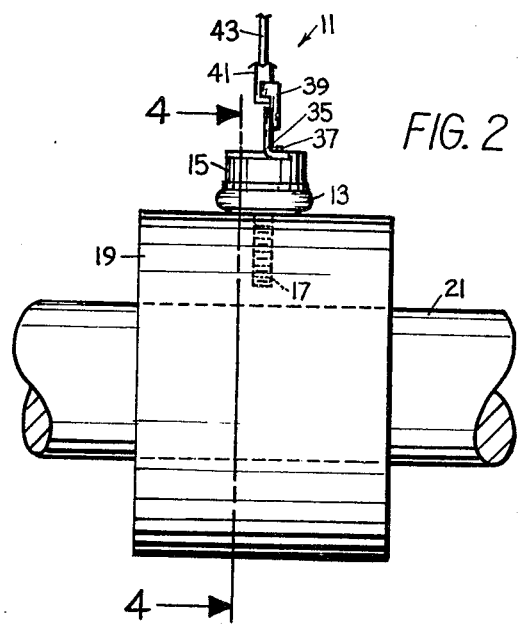
FIG. 2 is a side elevation of the device of FIG. 1 viewed from the right of FIG. 1, with the sheath and packing omitted.
Figure 3:
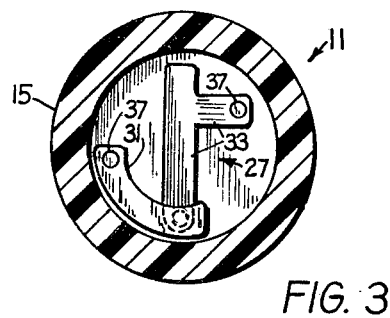
FIG. 3 is an enlarged plan view from below in section taken on the line 3—3 of FIG. 1, with the sheath and packing omitted.

Depending co-axially from the bottom of the cup 13 is rod 17 of good heat-conducting and corrosion-resistant metal integrally joined to the cup 13 (as by welding or brazing). The rod 17 is preferably threaded for being screwed into a tapped bore made in a bearing element, such as a sleeve bearing 19 for a shaft 21 (FIGS. 1 and 2).

A disc 23 of insulating material is clamped between the cups 13 and 15 to provide a lower shallow chamber to loosely confine a bimetallic-disc snap-type thermostat 25, and an upper chamber to house a normally closed switch 27. The insulating disc 23 is axially bored to hold and guide an insulating pin 29 by which the thermostat 25 actuates the switch 27 when it snaps into its upwardly convex switch-opening position to signal bearing overheating (e.g. 180 to 210 degrees F.).

The switch 27 comprises a metallic strap 31 and a spring arm 33. The parts 31 and 33 are connected to L-shaped terminals 35 by rivet elements 37. The terminals 35 have formed on or soldered thereto conventional elements 39 for gripping the insulating sheaths 41 of lead wires 43 which are soldered to the terminals 35.

Figure 5:
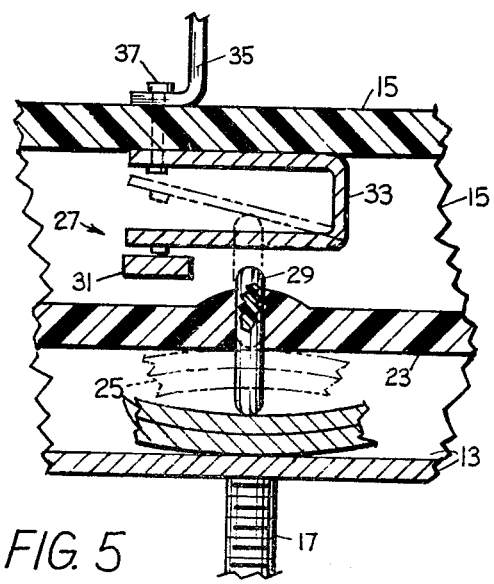
FIG. 5 is a further enlarged fragmentary elevational section taken on the line 5—5 of FIG. 4.
Figure 6:
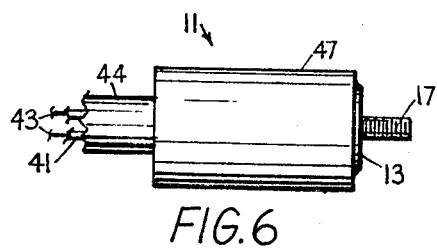
FIG. 6 is a side view of the plastic-sheathed finished device.

While the switch 27 is shown as being normally closed as a safety feature to prevent a power failure from producing an alarm signal, it should be noted that the switch could easily be designed to be normally open, if preferred. This could be easily effected by mounting the switch contact 31 above the contact 33 (in FIGS. 4 and 5). The assemblage is packed in a semi-hardening plastic 45 in a close-fitting plastic sleeve 47, both plastics being heat-resistant.

The invention having been described, what is claimed is:

1. A miniature bearing-temperature-sensing device, comprising: a shallow flat-bottomed good-heat-conductive metallic cup, a therewith-cavities-mating inverted cup molded of heat-resistant and electrically insulating hard-plastic material, a disc of similar insulating material interposed between said cups to divide the space enclosed by said mated cups into a lower shallow chamber and an upper shallow chamber, relatively movable switch contacts mounted in said upper chamber, a bimetallic snapdisc thermostat loosely held in said lower chamber with its convex surface when cool lying in contact with the bottom wall of said metallic cup, means responsive to snap-flexing of said thermostat for moving said contacts between their circuit-controlling positions, a metallic rod heat-conductively fixed to and depending from the bottom of said metallic cup for insertion into a socket formed in an element of a bearing to be temperature-monitored, a close-fitting plastic-sleeve housing surrounding said cups, and an insulating packing material filling the space between said housing and said cups, the diameters of said cups being less than twenty millimeters.

2. A device according to claim 1, said contact-moving means being an insulating pin held and guided in a slender axial bore in said space-dividing disc.

3. A device according to claim 1, said metallic rod being threaded for improved anchorability to and heat-exchange with a bearing element.

4. A device according to claim 1 and additionally comprising external electric terminals connected to said switch contacts, said terminals being bendable for vertical or for horizontal orientation.

5. A device according to claim 1, said packing material being a semi-hardening plastic material.

* * * * *